United States Patent

[11] 3,627,012

| [72] | Inventor | Henry R. Fletcher, deceased late of Birmingham, England (by Agnes Marion Fletcher, executrix) |
|---|---|---|
| [21] | Appl. No. | 20,266 |
| [22] | Filed | July 16, 1969 |
| [45] | Patented | Dec. 14, 1971 |
| [73] | Assignee | Dunlop Holdings Limited |
| [32] | Priority | July 16, 1968 |
| [33] | | Great Britain |
| [31] | | 33,745/68 |

[54] PNEUMATIC TIRES
11 Claims, 1 Drawing Fig.

[52] U.S. Cl. .................................................. 152/357
[51] Int. Cl. .................................................. B60c 9/16

[50] Field of Search .................................................. 152/357, 359, 361, 362

[56] References Cited
UNITED STATES PATENTS

| 2,792,868 | 5/1957 | Benson | 152/357 |
| 2,987,095 | 6/1961 | Toulmin, Jr. | 152/357 |
| 3,032,963 | 5/1962 | Fenner | 152/357 |

*Primary Examiner*—James B. Marbert
*Attorney*—Stevens, Davis, Miller & Mosher

ABSTRACT: A pneumatic tire, especially an aircraft tire, having at least one carcass ply of steel cord fabric comprising individual wires of diameter of substantially 0.003 of an inch or less.

Patented Dec. 14, 1971
3,627,012
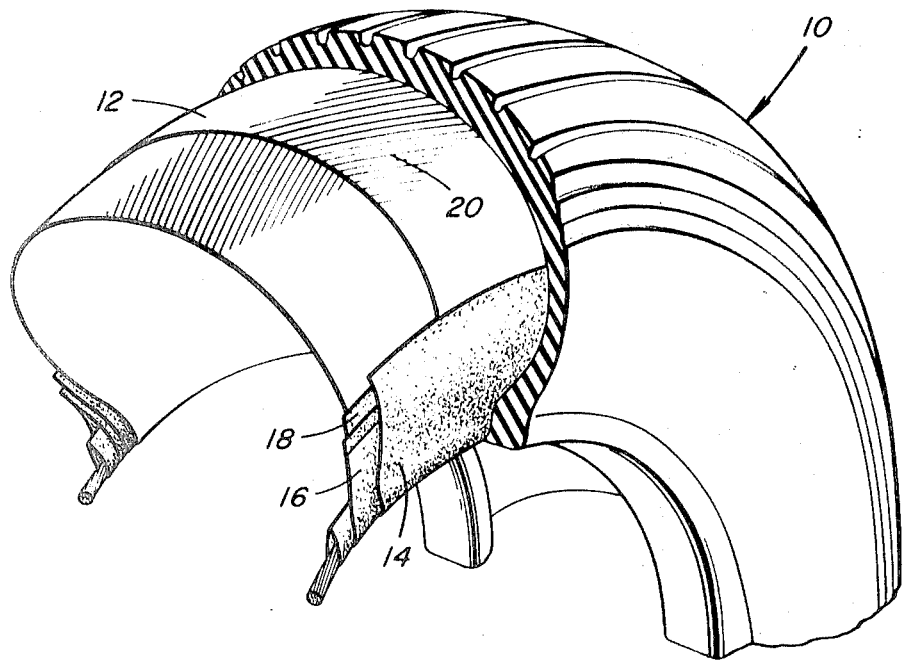
INVENTOR
HENRY R. FLETCHER
BY *Stevens, Davis, Miller & Mosher*
ATTORNEYS

PNEUMATIC TIRES

This invention relates to pneumatic tires.

In the specification of our copending U.S. Pat. application Ser. No. 819,983 filed Apr. 28, 1969 there is disclosed a method of producing rubberized steel cord fabric comprising forming a warp of steel cords comprising individual wires of 0.003 of an inch or less in diameter and applying a coating of hot unvulcanized rubber compound to the cords.

According to the present invention there is provided a pneumatic tire carcass having at least one ply of steel cord fabric comprising wire cords disposed in substantially parallel side-by-side relationship, the individual wires in the cords having a diameter of substantially 0.003 of an inch or less. The steel cord fabric may be rubberized and produced by the aforementioned method. The individual wires may have substantially smaller diameters e.g. 0.0016 of an inch or less.

The carcass may be of radial ply construction i.e. the ply cords cross the midcircumferential plane of the carcass of 90° thereto, or of cross ply construction, i.e. the ply cords cross the midcircumferential plane of the carcass at less than 90° the cords of one ply crossing the cords of an adjacent ply.

According to the invention also there is provided a pneumatic tire comprising a carcass as described in the two preceding paragraphs.

This invention is illustrated in the accompanying single FIGURE of drawings which is a section through a portion of a tire constructed according to this invention.

Preferably the said tire 10 comprises at least one reinforcing ply, layer or strip of steel cord fabric other than a carcass ply, comprising wire cords disposed in substantially parallel side-by-side relationship, the individual wires in the cords having a diameter of 0.003 of an inch or less. Examples of such a reinforcing ply, layer 12 or strip are a breaker ply or layer, a tread reinforcing ply or layer, a shoulder reinforcing ply or strip 14, a flipper 16, a chafer strip and a filler strip.

A tire according to the invention when mounted on a wheel in a normally inflated and unloaded condition may advantageously have a smaller sectional width and height or have a more squat section i.e. have a comparatively smaller ratio of sectional height, measured from the peak of the crown to the bead base, to overall sectional width, than is conventionally provided in tires incorporating textile or steel cord plies. Preferably, the squatness ratio is no greater than 0.90. Since a smaller sectional or more squat tire requires less material to be used in its construction than the more conventional tire there is an advantageous reduction in both weight and cost.

A carcass and/or tire according to the invention may be built by techniques conventionally used for building a carcass or tire incorporating steel cords or it may be built by substantially the same methods and by means of substantially the same apparatus as are used to build a carcass and/or tire incorporating plies of textile cords. This is due to the increased flexibility, ease of cutting and handling of the cords and plies incorporating wires of smaller diameter than have hitherto been used.

A tire according to the invention wherein metal cords have replaced textile cords has the advantage that cord growth is not likely to occur in use of the tire thereby reducing the occurrence of sidewall cracking. The ply turnup edge 18 is less likely to become unstuck or untacked in the unvulcanized state during manufacture due to the increased flexibility of the cords and, in addition, the more flexible ply turnup edge provides a better key for the rubber surrounding it and when vulcanized, a better bond thereto, because of the greater number of wires and greater surface area to which the rubber may bond. In general, more freedom of design of the bead region of a carcass or tire according to the invention is possible.

One example of the present invention comprises a 22×550–12 aircraft tire of cross ply construction. The carcass of this tire comprises 2 plies, the cords of which cross the midcircumferential plane of the tire in the crown region at 35°. Each ply comprises 0.038 inch diameter steel cords 20 comprising 2 yarns each of which incorporates 141 individual wires 0.0016 inch in diameter, the twist of the cords being substantially 7½ turns per inch and the twist of the wires, as they lie in the cord, being substantially zero. The spacing of the cords 20 in the ply is such that the number of ends per inch is 15.

The tire is built by substantially conventional methods to have single bead construction and a squatness ratio of 0.90.

In general, aircraft tires of cross ply construction have to withstand high deflections of the order of 30 percent or more in use, and hitherto tires incorporating steel cord plies have been unable to withstand deflections of more than approximately 15 percent without the carcass cords buckling. To avoid this, aircraft tires incorporating steel cord plies in cross ply configuration have either been oversize or overinflated. Neither of these alternatives is very practical so that aircraft tires of cross ply construction generally comprise textile cords which enable the tire to withstand these higher deflections more readily.

A tire according to the invention has adequate fatigue properties and is capable of withstanding the high deflections referred to previously. The carcass is capable of resisting buckling more readily since under a compressive load, the individual wires of the cords, being of smaller diameter than hitherto used in tires, flex to a greater extent than the larger diameter wires and return to their original positions in the cord after the compressive load is removed without damage to the cord occurring. The likelihood of the formation of dislocations i.e. increased local wire spacing, is reduced.

Additionally, for a given cord strength, the use of a cord having a larger number of smaller diameter wires compared to cord having a smaller number of larger diameter cords as hitherto used has the advantage that the local strain on the rubber surrounding each wire i.e. between wires in the cord, is reduced when a compressive load is applied.

Compared to a tire incorporating textile cords, a tire according to the present invention is less likely to fail if it becomes inadvertently overloaded or is used in an underinflated condition.

Further, aircraft operating at high e.g. supersonic, speeds generate large amounts of heat due to frictional effects as they pass through the atmosphere. Because of this, the temperature of the tires of such aircraft rises and may exceed the safe operating temperature of tires incorporating textile cords — the textile cords degenerating at relatively high temperatures and causing tire failure. Since steel is not affected by this temperature rise, a tire made in accordance with the invention will overcome this problem.

The present invention may be used in tire constructions incorporating the inventions of the assignee's copending U.S. Pat. application Ser. Nos. 834,614 filed June 17, 1969; 22,717 filed July 16, 1969, 20,267 filed July 16, 1969 and 855,432 filed Sept. 4, 1969.

Having now described my invention — what I claim is:

1. A pneumatic tire carcass having at least one ply of steel cord fabric comprising wire cords disposed in substantially parallel side-by-side relationship, the individual wires of the cords having a diameter of substantially 0.003 of an inch or less.

2. A pneumatic tire carcass according to claim 1 of radial ply construction.

3. A pneumatic tire carcass according to claim 1 of cross ply construction, having at least two plies of steel cord fabric comprising wire cords disposed in substantially parallel side-by-side relationship, the individual wires of the cords having a diameter of substantially 0.003 of an inch or less.

4. A pneumatic tire carcass according to claim 1 wherein the wires have a diameter at the most of 0.0016 of an inch.

5. A pneumatic tire carcass according to claim 1 wherein the cords each comprise 2 yarns, and the cord twist is substantially 7½ turns per inch.

6. A pneumatic tire carcass according to claim 1 wherein the cord spacing is such that there are 15 ends per inch.

7. A pneumatic tire comprising a carcass according to claim 1.

8. A pneumatic tire according to claim 7 comprising at least one reinforcing ply, layer or strip of steel cord fabric other than a carcass ply, comprising wire cords disposed in substantially parallel side-by-side relationship, the individual wires in the cords having a diameter of substantially 0.003 of an inch or less.

9. A pneumatic tire according to claim 7 having a squatness ratio no greater than 0.90.

10. A pneumatic aircraft tire according to claim 7.

11. A high-speed pneumatic aircraft tire according to claim 7.